V. SKRIVANEK.
FLYING MACHINE.
APPLICATION FILED FEB. 25, 1913. RENEWED NOV. 25, 1916.
1,230,045.
Patented June 12, 1917.
2 SHEETS—SHEET 1.
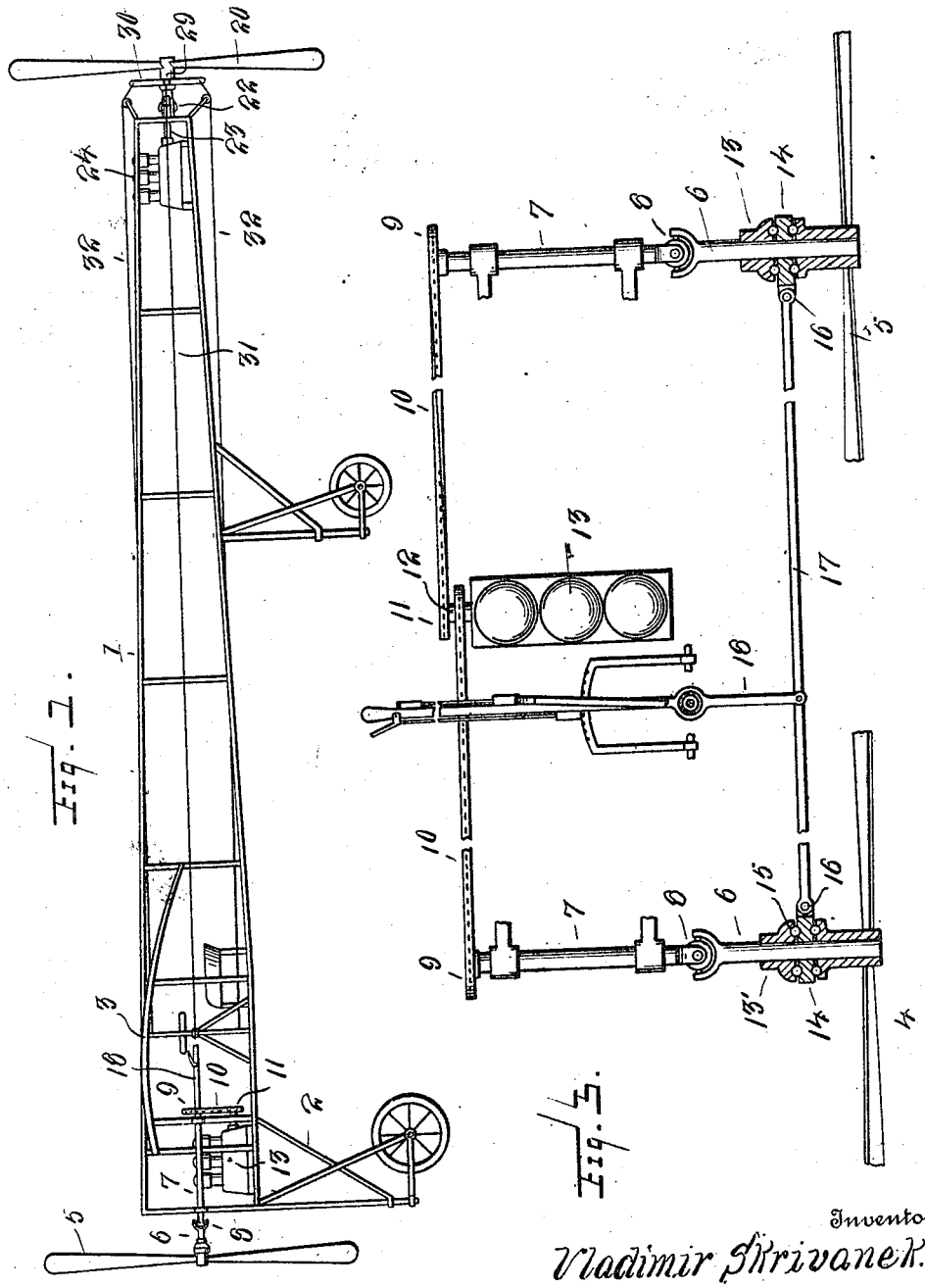
Witnesses
E. R. Ruppert
C. C. Hines
Inventor
Vladimir Skrivanek
By Victor J. Evans
Attorney V.-SKRIVANEK.
FLYING MACHINE.
APPLICATION FILED FEB. 25, 1913. RENEWED NOV. 25, 1916.
1,230,045.
Patented June 12, 1917.
2 SHEETS—SHEET 2.
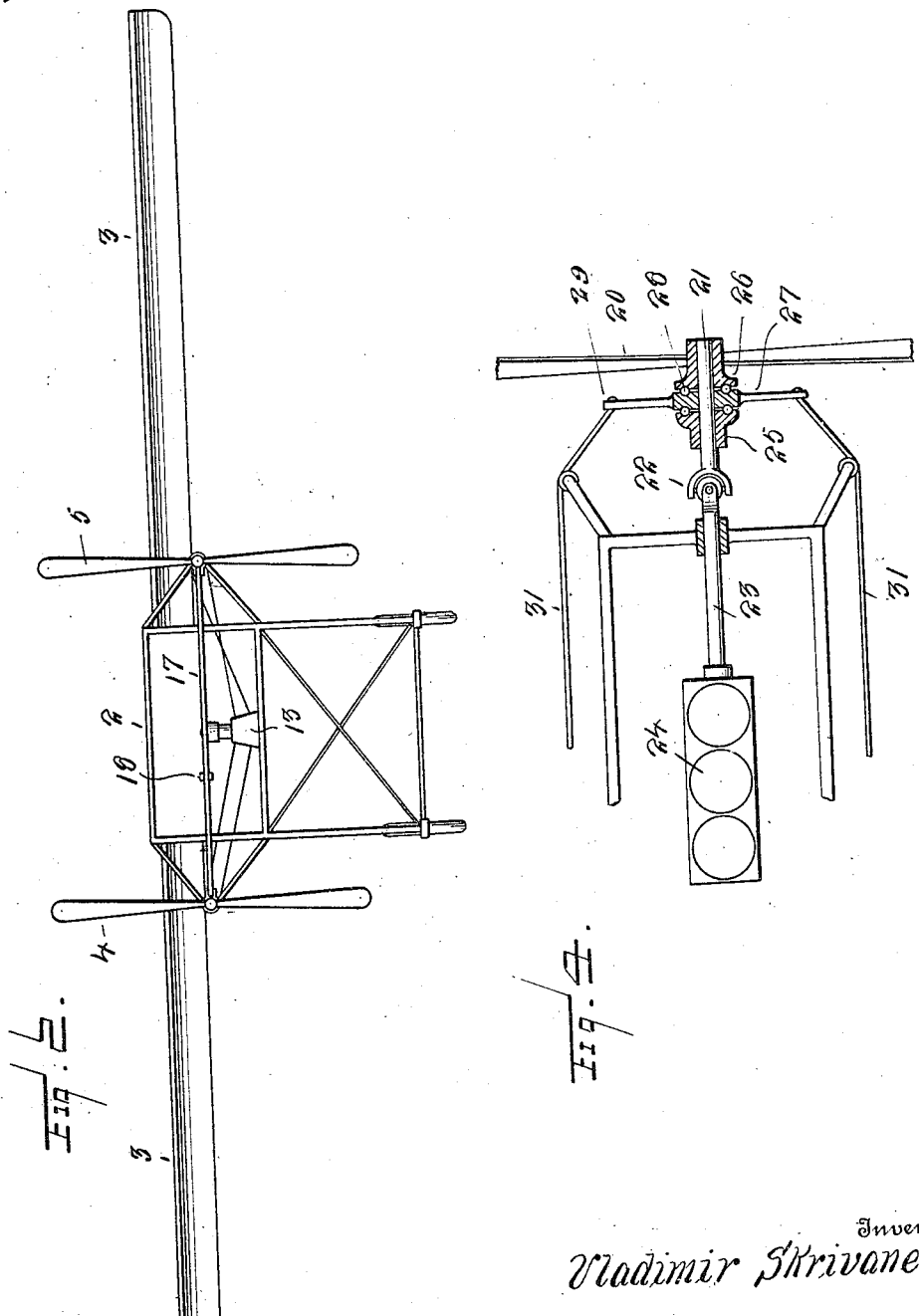

UNITED STATES PATENT OFFICE.

VLADIMIR SKRIVANEK, OF FORT WAYNE, INDIANA.

FLYING-MACHINE.

1,230,045.  Specification of Letters Patent.  Patented June 12, 1917.

Application filed February 25, 1913, Serial No. 750,634. Renewed November 25, 1916. Serial No. 133,487.

*To all whom it may concern:*

Be it known that I, VLADIMIR SKRIVANEK, a citizen of the U. S. of America, residing at Fort Wayne, in the county of Allen and State of Indiana, have invented new and useful Improvements in Flying-Machines, of which the following is a specification.

This invention relates to flying machines, including balloons and other aircraft, and particularly to the propelling and steering devices thereof, the object of the invention being to provide a propelling mechanism in which the propellers are adjustable to steer the machine in any given path, whereby the use of rudders may be dispensed with or the propellers arranged to operate in conjunction with rudders so as to increase the sensitiveness of control of the machine.

The invention consists of the features of construction, combination and arrangement of parts, hereinafter fully described and claimed, reference being had to the accompanying drawings, in which:—

Figure 1 is a view in side elevation of a flying machine embodying my invention.

Fig. 2 is a front elevation of the same.

Fig. 3 is a sectional plan view on an enlarged scale.

Fig. 4 is a similar view of the rear propeller and its driving and adjusting devices.

In the accompanying drawings, I have shown the application of my invention to a monoplane machine, 1 designating the body of the machine; 2 the main frame thereof; and 3 the main plane or supporting surface.

Arranged at the front of the machine are propellers 4 and 5, keyed or otherwise secured to short shafts 6 universally jointed to transmission shafts 7, as at 8. The shafts 7 carry sprocket wheels 9 connected by chains 10 with drive sprockets 11 on the drive shaft 12 of a motor 13, suitably supported upon the main frame. In practice, one of the chains 10 is crossed or suitably geared with the shaft 12 to drive the shaft 7 operated thereby in the opposite direction to its companion shaft 7. The shafts 6, which constitute the jointed portions of the shafts 7, are provided with fixed collars or sleeves 13' spaced from the hubs of the propellers 4 and 5, and loosely mounted on said shafts 6 between said collars 13' and the propeller hubs are sleeves 14, arranged to turn in contact with suitable anti-friction bearings 15. The collars 14 are jointed, as at 16, to a link bar or other suitable connection 17, whereby said collars 14 are held stationary in the revolution of the shafts 6 and the propellers 4 and 5 and whereby motion may be transmitted through said collars to swing the shafts 6 vertically or laterally in the same direction. The link 17 may receive motion from any suitable operating device 18 whereby the propellers may be simultaneously adjusted in the same direction vertically or laterally and any suitable means may be employed for securing said operating device in adjusted position. It will be apparent from the construction described that both propellers may be normally disposed to rotate upon horizontal, parallel fixed axes for driving the machine forward in a straight line, or that they may be adjusted either vertically or laterally from their normal plane of rotation to exert a pull on either side of the longitudinal center of the machine or above or below their normal centers of rotation to steer the machine laterally in either direction or vertically at the will of the pilot or operator of the machine.

In conjunction with the front propellers 4 and 5, I may employ a rear propeller 20 keyed or otherwise fixed upon a shaft 21 universally jointed, as at 22, to the shaft 23 of the rear engine or motor 24. The shaft 21 is provided with a fixed collar 25 arranged in spaced relation to the hub of the propeller, between which and said fixed collar 25 is interposed a collar or sleeve 26 formed integral with the propeller or shaft. A collar or sleeve 27 is loosely mounted on said shaft section 21 between the collars 25 and 26 and between this collar 27 and the collars 25 and 26 are interposed anti-friction bearings 28, by which the shaft and parts carried thereby may rotate without material resistance from the movable collar. The said movable collar is provided with two sets of arms 29 and 30 projecting laterally and vertically from diametrically opposite sides thereof. To the horizontal arms are attached chains or other operating connections 31 and to the vertical arms are attached chains or other operating connections 32 which connections extend to one or more suitable controlling or steering devices on the body or main frame, whereby the shaft 21 may be swung either vertically or laterally for steering action of the propeller 20. In practice, all three propellers may be employed, or the rear propeller may be used without the front propellers, the front propeller employed without the rear propeller, or any desired number or arrangement of propellers may be mounted for steering action as described at the front or rear of the machine for a combined propelling and steering action. I, therefore, do not limit the invention in these respects.

It will be observed that my invention provides a main frame carrying a supporting surface and having relatively short and long head and tail frames, that the front propelling mechanism is arranged at a point wholly in advance of a perpendicular line or plane intersecting the horizontal transverse axis of the machine and the centers of gravity and pressure when such centers and axis coincide and the machine is longitudinally balanced; also that the rear propelling mechanism and aviator's seat are disposed wholly in rear of such line, while the controlling means for adjusting the respective propellers is disposed at a point between the aviator's seat and such perpendicular line. These elements are so proportioned as to weight that the weight of the head frame, front motor and front propelling mechanism normally counterbalances the weight of the tail frame, rear motor, rear propelling mechanism, the aviator's seat and that of an aviator of a determined weight, whereby when the machine is in flight under all ordinary or normal conditions the centers of gravity and pressure will coincide vertically with each other and with the horizontal transverse axis of the machine, or be in register with a perpendicular line intersecting the three mentioned points. As a result, a machine which is normally balanced and neither head nor tail heavy, and in which the balances are accurately preserved by the front and rear propellers is produced, whereby increased balancing efficiency is obtained.

Having thus described the invention, I claim:—

1. In a flying machine, the combination of a main frame, a supporting surface carried by the main frame, relatively short and long head and tail frames respectively projecting from the main frame, propelling mechanism mounted upon the head frame at a point wholly in advance of a perpendicular line intersecting the horizontal transverse axis of the machine and the centers of gravity and pressure when the machine is balanced, an aviator's seat mounted upon the head frame at a point in rear of such perpendicular line, propelling mechanism at the extremity of the tail frame, the said propelling mechanisms each embodying a driving motor and universally adjustable propellers, and the rear propelling mechanism being arranged for coöperative action with the weight of the aviator to balance the weight of the forward propelling mechanism and maintain and establish coincidence between a perpendicular line intersecting such axis and the centers of gravity and pressure when the machine is in flight, and adjusting means disposed at a point between the aviator's seat and such perpendicular line for transmitting adjusting motions to the respective propellers.

2. In a flying machine, the combination of a main frame having a supporting surface and a head frame extending in advance thereof, bearings upon said head frame, a pair of horizontal longitudinally extending shafts journaled upon said head frame on opposite sides of the longitudinal center of the machine, a motor mounted upon said head frame mainly in advance of said supporting surface, sprocket gears upon the shaft of said motor, sprocket gears upon the said longitudinally extending shafts, driving chains connecting the sprocket gears on the motor shaft with the sprocket gears on the longitudinally extending shafts, propeller shafts universally joined to said longitudinally extending shafts at points in advance of the head frame, hubs fixed to said propeller shafts and carrying propellers, collars fixed to said propeller shafts in spaced relation to said hubs, collars loosely mounted on the propeller shafts between the hubs and collars, anti-friction bearings between the loose collars and the coacting hubs and fixed collars, a horizontal and transverse link bar pivotally connecting the loose collars, whereby the propeller shafts may be simultaneously adjusted laterally or vertically in either direction from a normal position, a horizontal rearwardly extending universally joined lever pivotally connected with said link bar whereby the same may be moved in an endwise or vertical direction, said lever having a handle extending inwardly beyond the motor and gearing, means for locking said lever in adjusted position, and an aviator's seat mounted upon the main frame adjacent to and in rear of said lever.

In testimony whereof I affix my signature in presence of two witnesses.

VLADIMIR SKRIVANEK.

Witnesses:
VAELAR CERNY,
FR. PRUCHA.